United States Patent [19]

McCord, Jr.

[11] Patent Number: 4,589,458

[45] Date of Patent: May 20, 1986

[54] MULTIPLE SAW BLADE ADJUSTABLE DADO CUTTER

[75] Inventor: Wilfred M. McCord, Jr., Louisville, Ky.

[73] Assignee: Vermont American Corporation, Louisville, Ky.

[21] Appl. No.: 665,737

[22] Filed: Oct. 29, 1984

[51] Int. Cl.⁴ ............................................. B27B 33/00
[52] U.S. Cl. ..................................... 144/238; 144/218
[58] Field of Search .................... 144/235, 238, 90 R, 144/90 A, 218

[56] References Cited

U.S. PATENT DOCUMENTS

| | | | |
|---|---|---|---|
| 1,626,599 | 4/1927 | Rozier | 144/238 |
| 3,780,780 | 12/1973 | Pettigrew et al. | 144/238 |
| 4,305,441 | 12/1981 | Ohmi | 144/238 |

FOREIGN PATENT DOCUMENTS 121863 8/1927 Switzerland ......................... 144/238

*Primary Examiner*—Francis S. Husar
*Assistant Examiner*—Jorji M. Griffin
*Attorney, Agent, or Firm*—Harry B. O'Donnell, III

[57] ABSTRACT

This invention relates to a dado cutting circular saw arrangement and more particularly to an arrangement comprising a pair of saw blades which are adjustable from a minimum dado width cutting position wherein the blades are juxtaposed relative to a plane perpendicular to the rotational axis of the blades. A cam arrangement adapted to be interposed between the saw blades is employed for selectively adjusting the position of the blades to cut dados of varying widths. The cam arrangement causes the blades to pivot from their minimum dado position, juxtaposed to the plane, about adjacent peripheral pivot points in a manner that selectively adjustably positions the peripheral edges of the blades diametrically opposite from those adjacent pivot points outward relative to the plane and, thus, provide a range of dado cutting widths.

15 Claims, 10 Drawing Figures

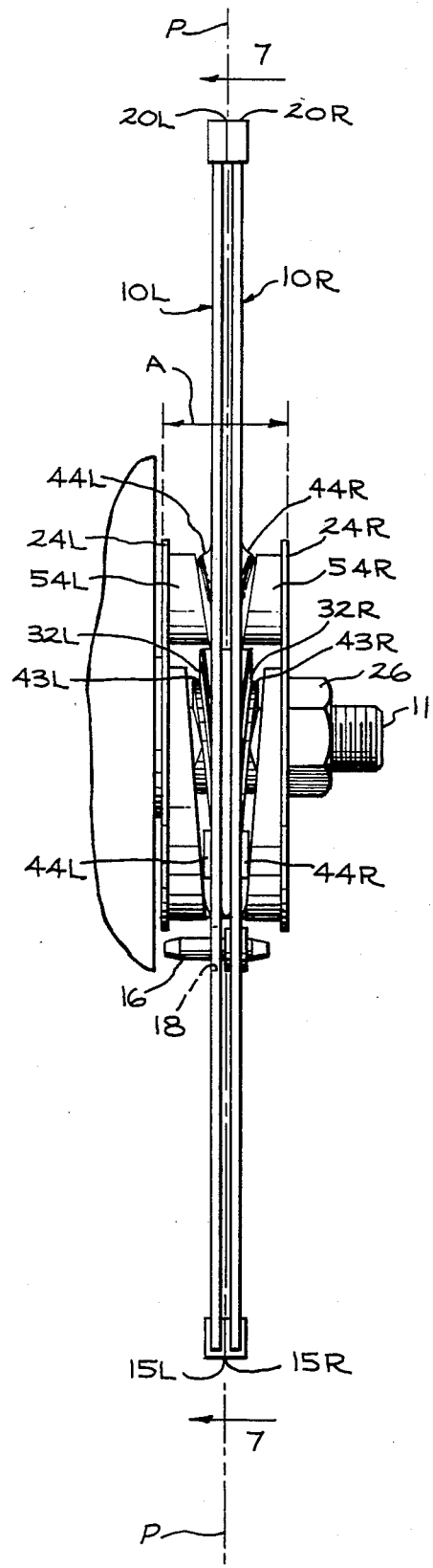
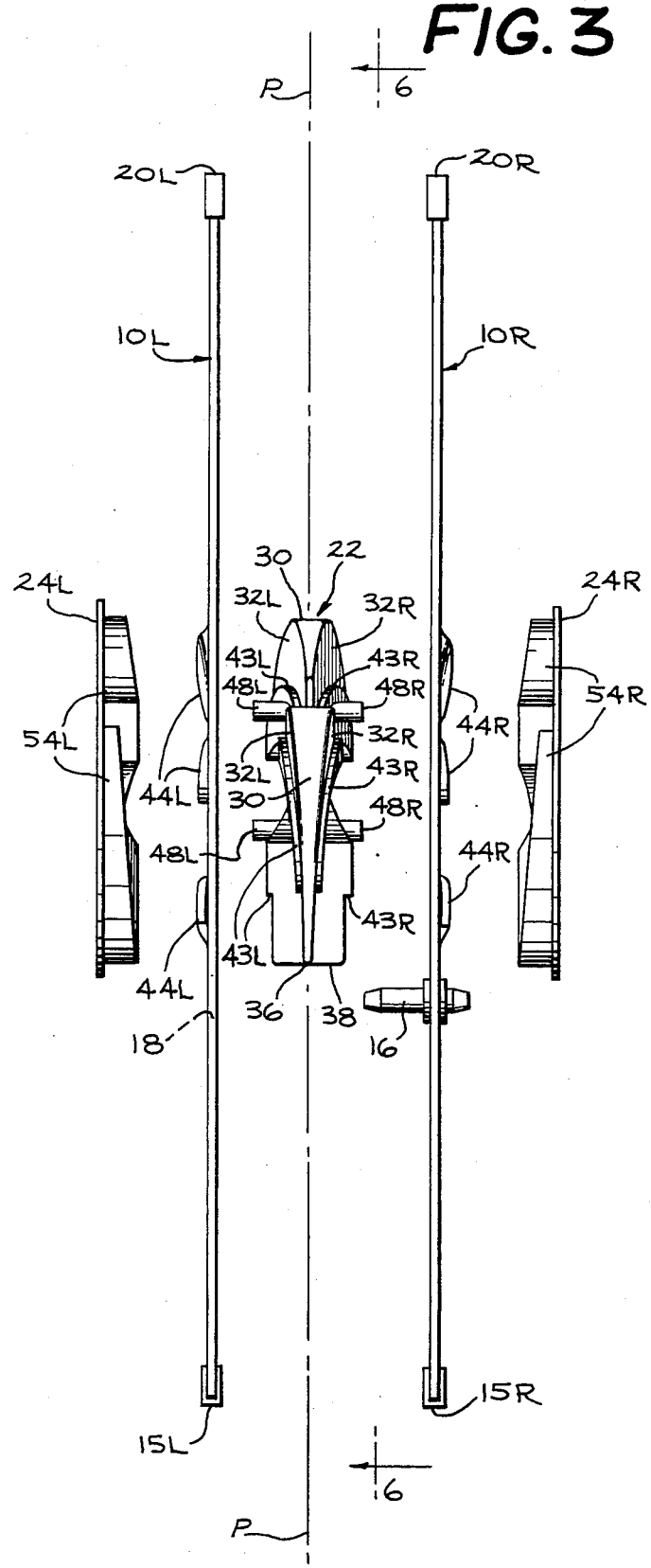

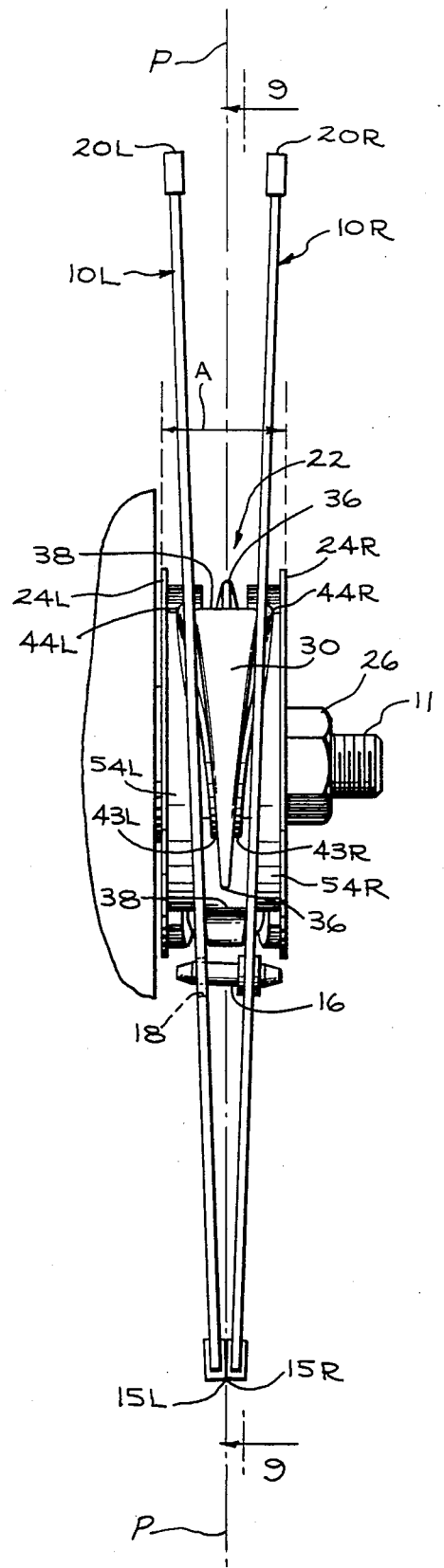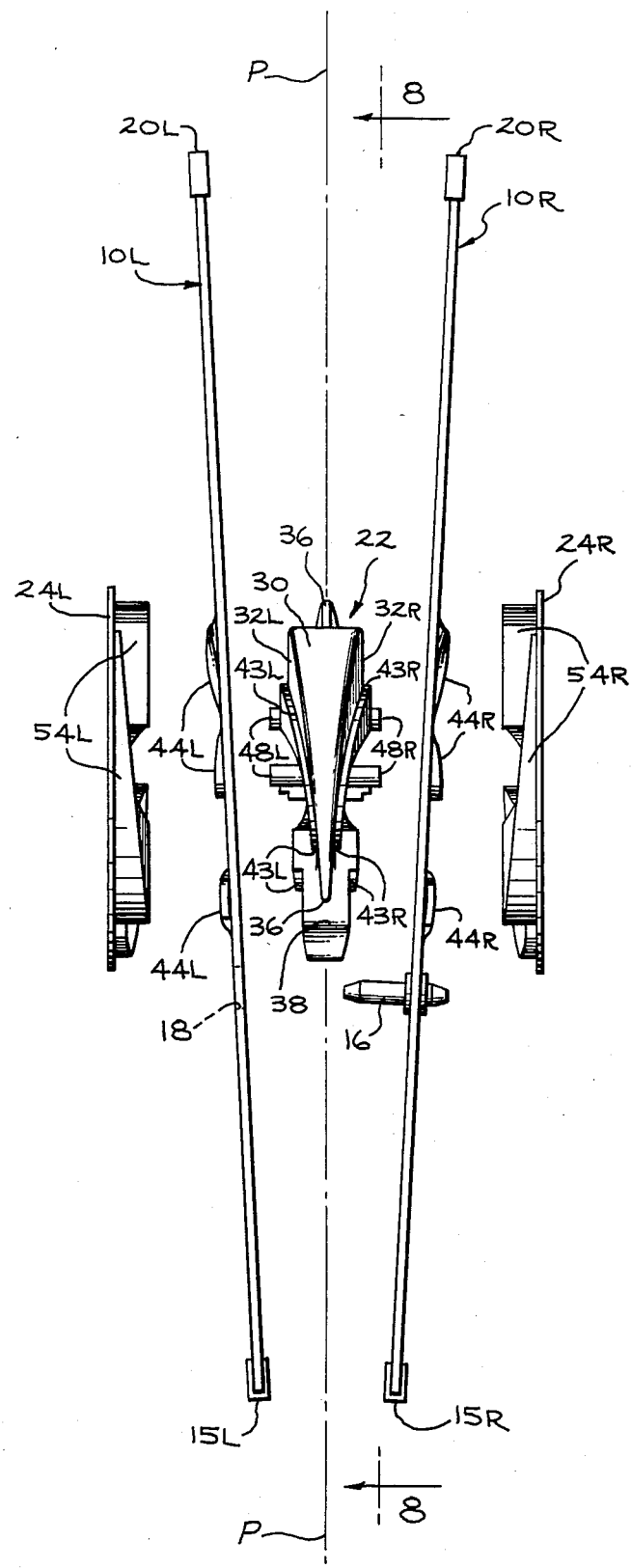

MULTIPLE SAW BLADE ADJUSTABLE DADO CUTTER

BACKGROUND OF THE INVENTION

The present invention relates to wobble dado cutting circular saw arrangements and more particularly to a dual blade dado cutting arrangement wherein at least one point on the periphery of each of the blades is maintained juxtapositioned.

In some present dado cutting arrangements, a single blade is employed for cutting dados of varying widths. When a single blade is employed for cutting dados of varying thickness, the blade is pivoted on the axis of the spindle. In this type arrangement, the single blade pivots or wobbles about the axis as it cuts the full width of the dado. This pivoting or wobbling action of the blade in traversing the full width of the dado cuases its peripheral edge to travel through a plane which is not parallel with the axis of rotation. The arc through which the peripheral edge of the blade travels causes the bottom or base wall of the dado to be curved. Further, the torque force of the wobbling blade causes an unbalance of forces that results in both rotational and torsional vibrations. In some instances, depending on the obliquity of the blade and speed of rotation, the vibration can be objectionable. In U.S. Pat. No. 17,823 (Harrison), two saw blades are employed with each blade being independently adjustable. In this instance, the blades are spaced apart with each blade pivoted about the spindle so as to leave a tongue of a desired thickness between the blades. This arrangement merely employs two separate one blade systems to cut away an area on either side of a tongue. The blades in this arrangement, which are pivoted about the axis of rotation, may in fact increase the torque forces depending on the position of the blades relative to each other.

Accordingly, it is an object of the present invention to provide a twoblade dado cutting arrangement wherein the vibration caused by the rotation of the wobbling blades is minimized by positioning the blades so that the forces generated by each blade neutralize each other.

SUMMARY OF THE INVENTION

In accordance with the present invention, there is provided an adjustable multiple circular saw blade dado cutting arrangement. The arrangement comprises a pair of circular saw blades which include a central opening rotatably mounted on a common axis. A central hub means rotatable on the axis supports the saw blades adjacent each side of a central plane which is perpendicular to the axis. The central hub means provides a blade adjusting means which includes a plurality of cam segments each including cam faces extending axially outwardly from each side of the plane so as to position cam faces in cooperative engagement with each of the blades.

Associated with the central openings of each of the blades are cam following members dimensioned for engaging cooperating one of the cam faces on each side of the plane. Relative rotation between the cam followers on the blades and the cam faces on the central hub means will cause each of the blades to diverge outwardly relative to the plane from radially aligned adjacent to a first point on the peripheral edge of each of the blades juxtaposed to the plane. The obliquity of the blades relative to the plane selectively adjustably positions a second point on the peripheral edge of each of the blades diametrically opposite from the first point a selected distance from the plane whereby each of the blades will cut the dado outwardly between the central plane and its outer dimension determined by the second points.

BRIEF DESCRIPTION OF THE DRAWINGS

FIG. 2 is a front elevational view showing the parts of FIG. 1 assembled with the kerf in the minimum dado cutting position;

FIG. 3 is an exploded elevational view similar to FIG. 2 showing the saw blades with the kerf in the minimum dado cutting position;

FIG. 4 is a front elevational view showing the parts of FIG. 1 assembled with the kerf in the maximum dado cutting position;

FIG. 5 is an exploded elevational view similar to FIG. 4 showing the saw blades with the kerf in the maximum dado cutting position;

DESCRIPTION OF THE PREFERRED EMBODIMENT

Figure 1:
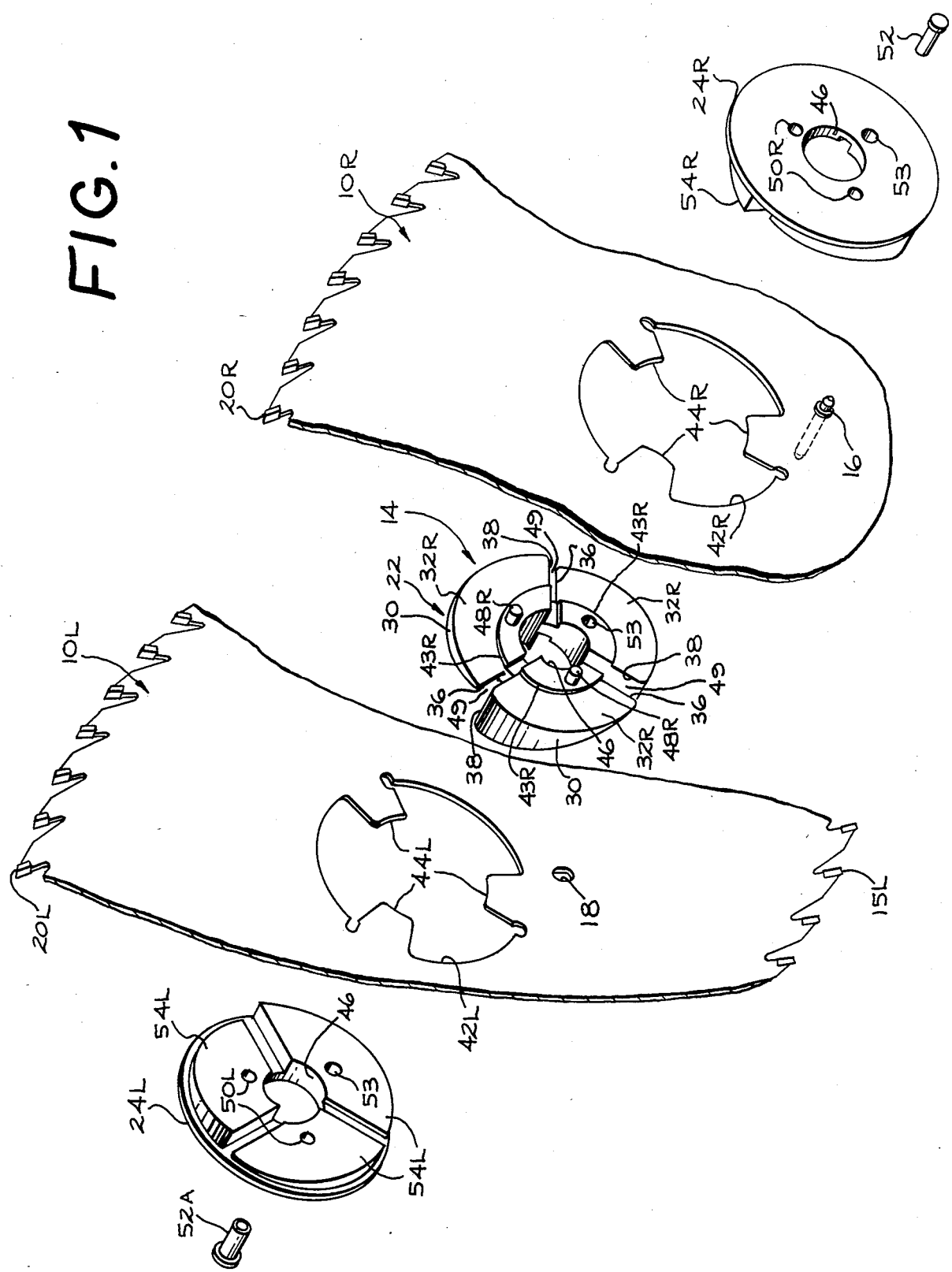
FIG. 1 is an exploded fragmentary view showing the parts of the adjustable dado cutting arrangement of the present invention.
Figure 6:
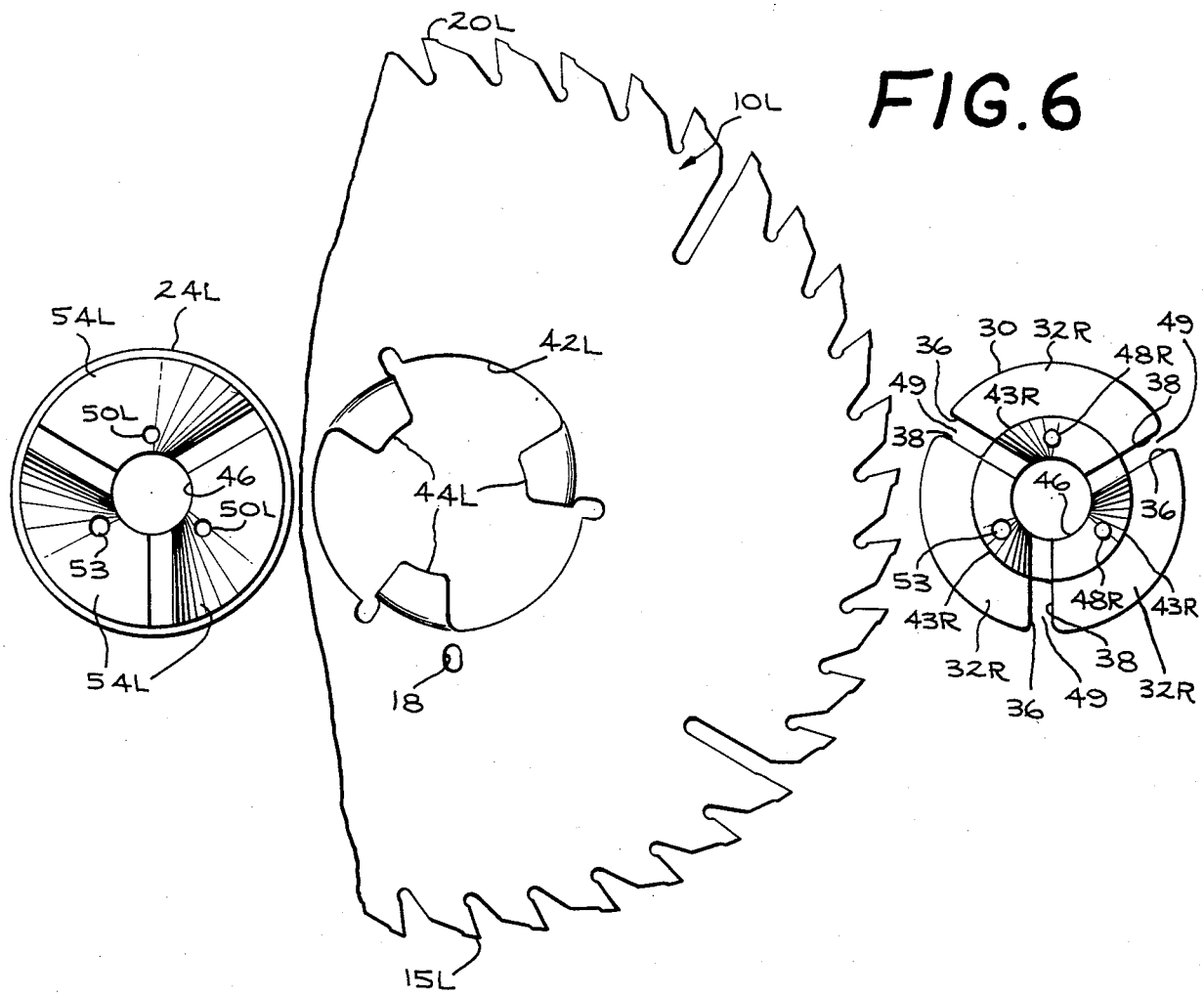
FIG. 6 is a fragmentary side elevational view taken along line 6—6 of FIG. 3 with the parts exploded to show details.

Referring now to the drawings, and more particularly to FIG. 1, there is shown a presently preferred embodiment of the dual saw blade dado cutting assembly that is provided in accordance with the present invention, including a pair of circular saw blades 10L and 10R mounted on a central hub assembly 14. The central hub assembly 14 includes a central cam member 22 and outer cover members 24L and 24R. In accordance with the present invention, the width of the dado to be cut by the dual saw blades 10L and 10R is determined by the obliquity of the blades 10L and 10R relative to a central plane P (FIGS. 2 and 4) that lies perpendicular to the axis of the spindle or arbor 11.

As shown in FIGS. 4 and 5, the obliquity of one saw blade relative to the plane P is a mirror image of the other saw blade and the components on each side of the plane P are in fact mirror images. Accordingly, the elements cooperating with the saw blade 10L located on the left-hand side of the plane P, as viewed in the drawings, will be described and designated by a reference numeral followed by the letter L. And, the corresponding mirror image parts or elements on the right-hand side of the plane P will be identified with the same reference numeral followed by the letter R.

As shown in the drawings, means are provided in accordance with the present invention which allow selective adjustment of the saw blades 10L and 10R from a position (shown in FIGS. 2 and 3) wherein the saw blades 10L and 10R are parallel to and juxtaposed to the plane P for providing the minimum kerf and accordingly the cutting of a minimum width dado. From this parallel position, the saw blades 10L and 10R are selectively adjustable to provide the maximum kerf and dado width, as shown in FIGS. 4 and 5.

The selective adjustments of the blades 10L and 10R between the minimum (FIGS. 2 and 3) and maximum (FIGS. 4 and 5) kerf positions is accomplished by pivoting each saw blade 10L and 10R about adjacent points 15L and 15R in their peripheral edges. The pivot points 15L and 15R may, in fact, be a single or common point in the plane P.

Figure 10:
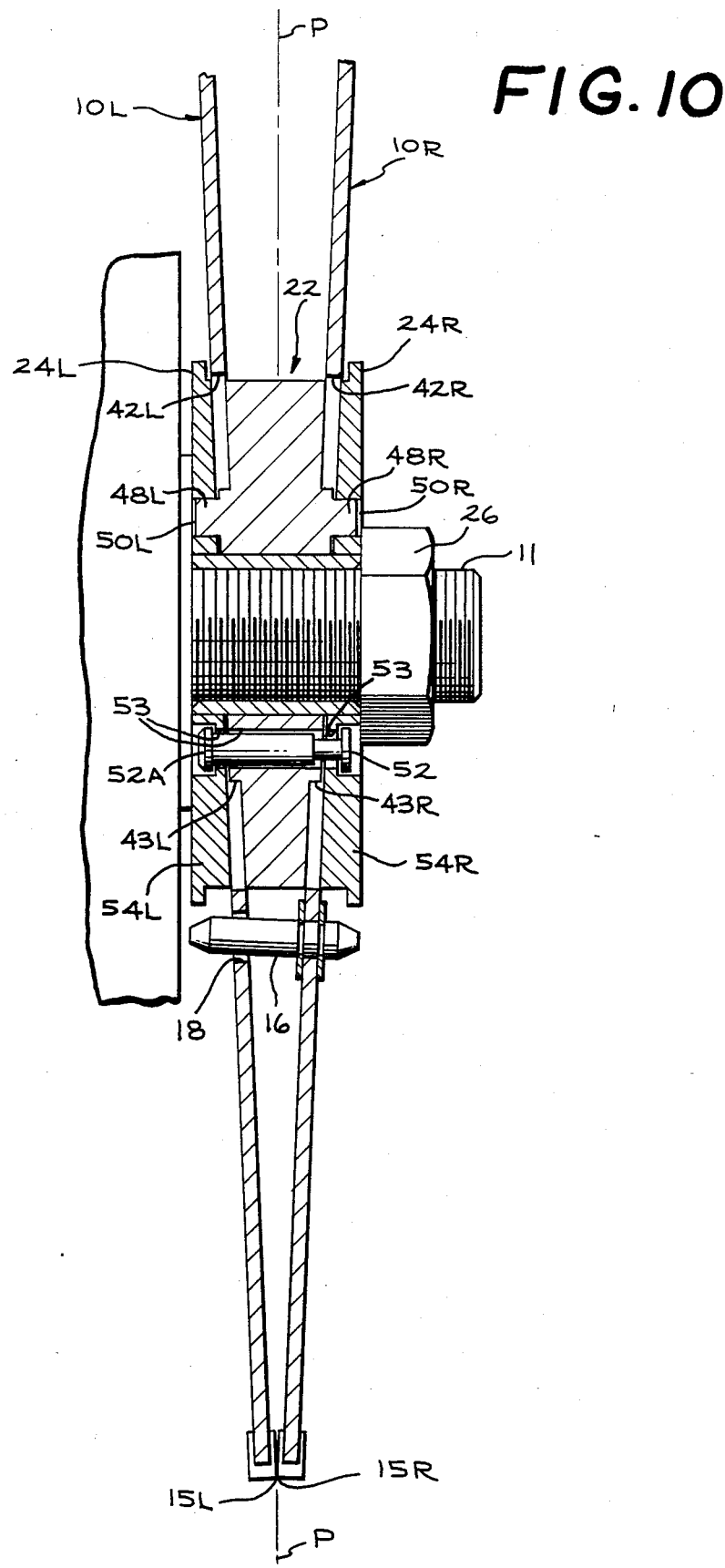
FIG. 10 is a vertical sectional view showing details of the assembly with the blades in the maximum dado cutting position.

Means are provided to insure that pivot points 15L and 15R remain juxtaposed, as shown in FIGS. 2, 4 and 10, and to cause the blades to rotate in unison. To this end, one of the saw blades 10R has secured therein a pin 16, which engages an aperture 18 in the other saw blade 10L, as shown in FIGS. 1 and 10. Accordingly, as shown in FIGS. 2 and 4, the pivot points 15R, and 15L remain opposite each other as the saw blades 10R and 10L rotate on the arbor 11.

As will be explained below, cam means formed on a central cam member 22 maintain the pivot points 15L and 15R juxtaposed to the plane P, while a second point 20L and 20R on the peripheral edge of each of the saw blades 10R and 10L, diametrically opposite from the first points 15L and 15R, respectively, moves axially outwardly an equal distance from the plane P. The axial spacing of these points 20R and 20L relative to the plane P determines the width of the dado. It should be understood that this pivoting of the saw blades 10L and 10R about the first points 15R and 15L, which remain juxtaposed to the plane P, allows each of the saw blades 10L and 10R to cut the dado from the center out. Since each saw blade 10L and 10R cuts half of the dado, the arc that the periphery of each of the blades 10L and 10R travels relative to the axis of rotation is minimized, and this causes their torque forces to neutralize each other.

Referring now to the details of construction as mentioned above, the central hub 14 includes the central cam member 22 and the complementary outer cover members 24L and 24R. As shown in FIGS. 2-5 and 10, the left saw blade 10L is sandwiched between the central cam member 22 and left cover member 24L, while the right saw blade 10R is sandwiched between the central cam member 22 and right cover member 24R. The selectively adjustable dado assembly, including the saw blades 10L and 10R, central cam member 22 and the outer cover members 24L and 24R, is mounted on the arbor 11 and secured thereto by a nut 26 (FIGS. 2, 4 and 10). The axial dimension A, shown in FIGS. 2 and 4, of the dado cutting assembly, as defined by outer surfaces of the cover members 24L and 24R when secured on the arbor 11, remains constant through adjustments between the minimum and maximum dado cutting position, as respectively shown in FIGS. 2 and 4.

In the illustrated embodiment, the central cam member 22 has formed therein three cam segments 30. The surfaces 32L and 32R of each cam segment 30, as viewed in FIGS. 1-5, diverge axially outwardly from a low point 36 located adjacent to the plane P to a high point 38 which extends axially an equal distance on each side of the plane P.

The saw blades 10L and 10R are respectively formed with a central opening 42L and 42R having a diameter greater than that of the central cam member 22, so as to allow at least a portion of the axially extending high point 38 of each of the cam segments 30 to be located in the central opening of their respective cooperating saw blade 10L and 10R when the blades 10L and 10R are in their closed position (shown in FIGS. 2 and 3). Extending radially inwardly from the peripheral edge of these central openings 42L and 42R are cam followers 44L and 44R, respectively. The inner radial ends of these cam followers 44L and 44R define an inner opening in the saw blades 10L and 10R by which the saw blades 10L and 10R, as will be explained later, are rotatably mounted on the central cam member 22. The cam followers 44L and 44R are so dimensioned and skewed relative to the major plane of their respective blades that the wall of each of the cam followers 44L and 44R facing its cooperating cam surface 32L and 32R intimately engages that cam surface of the cam segments 30. As will be explained fully below, during adjustment of the assembly between the minimum (FIGS. 2 and 3) and maximum (FIGS. 4 and 5) kerf positions, the cam segments 30 are interposed between these cooperating cam follows 44L and 44R.

Figure 7:
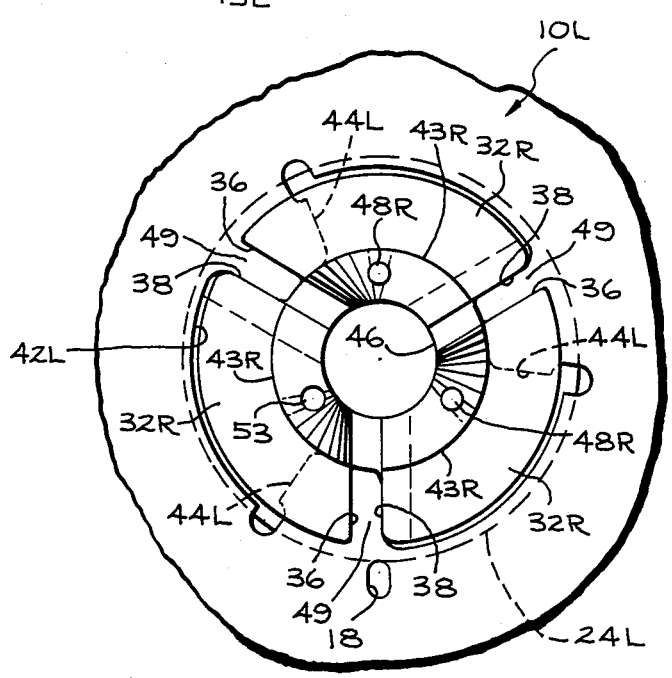
FIG. 7 is a fragmentary view showing the parts of FIG. 6 assembled as viewed in line 7—7 of FIG. 2.
Figure 8:
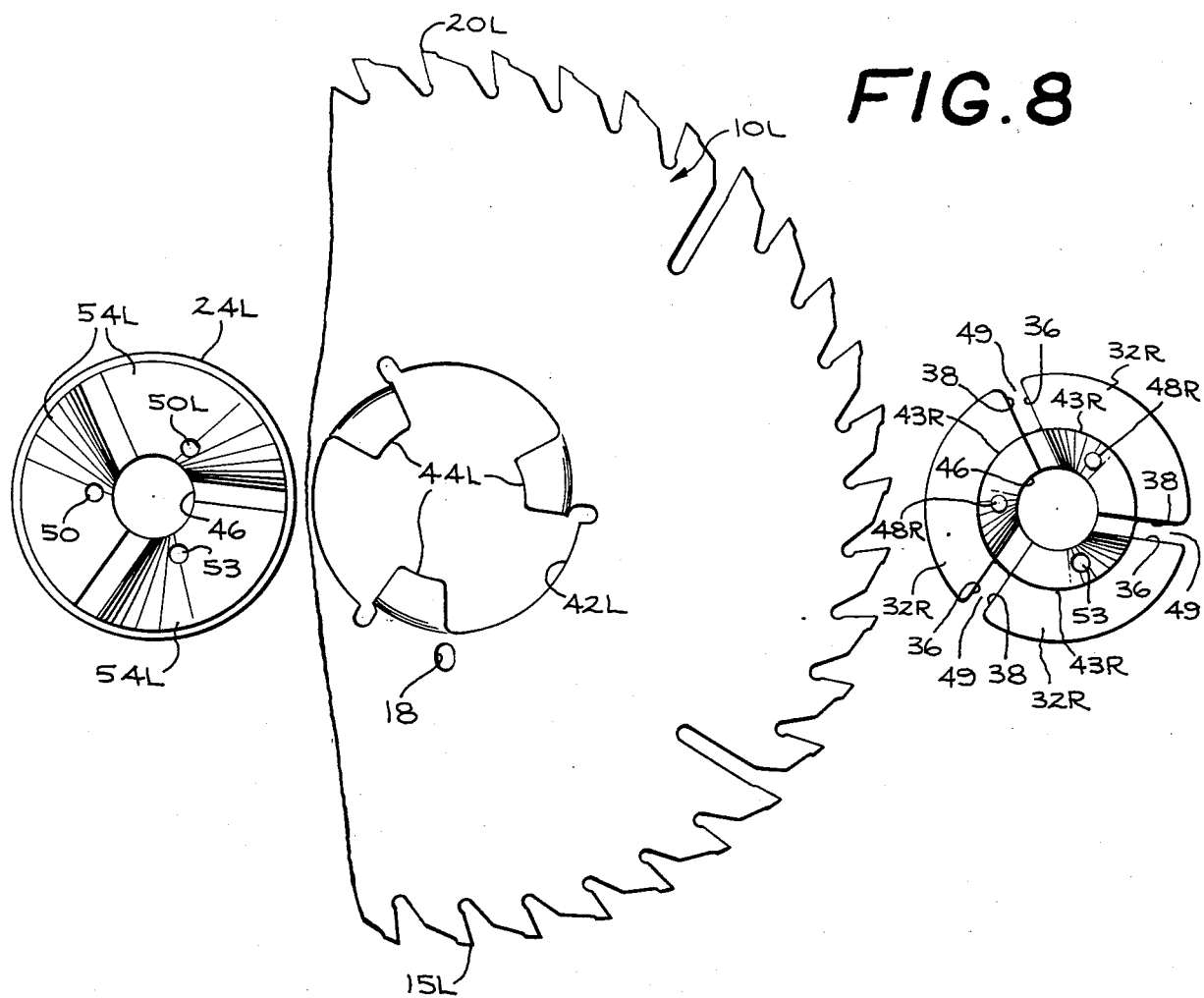
FIG. 8 is a fragmentary side elevational view taken along line 8—8 of FIG. 5 with the parts exploded to show details.
Figure 9:
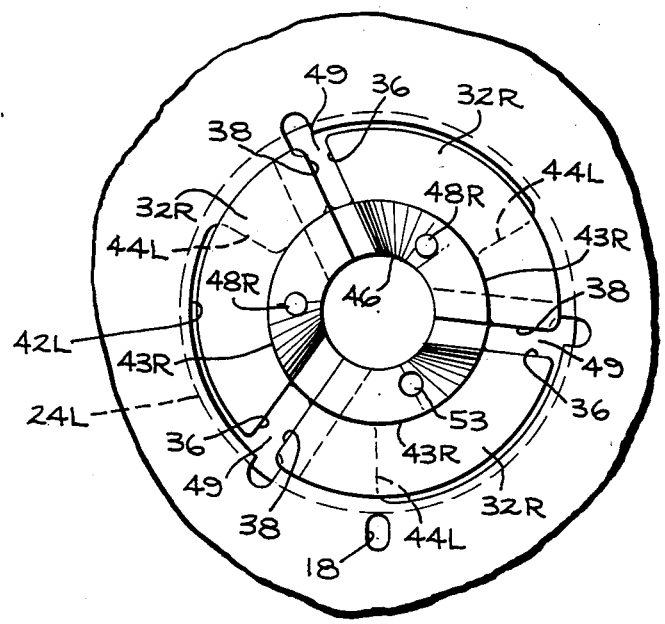
FIG. 9 is a fragmentary view showing the parts of FIG. 8 assembled as viewed in line 9—9 of FIG. 4.

The saw blades 10L and 10R are positioned relative to the central cam member 22 so that one cam follower 44L and 44R of each saw blade 10L and 10R is in contact with the cam surfaces 32L and 32R of its cooperating cam segment 30. The hub assembly central cam member 22 is provided with shoulder portions 43L and 43R on which the inner openings of their respective saw blades 10L and 10R, as defined by the radially inner edge of the cam followers 44L and 44R, are supported, as shown in FIGS. 7 and 9.

The members 22, 24L and 24R have a central opening 46 through which they are rotatably mounted on the drive spindle or arbor 11 (FIGS. 2, 4 and 10). The members 22, 24L and 24R are arranged to rotate together on the spindle 11. Accordingly, central cam member 22 is provided with axially extending pins 48L and 48R (FIGS. 1, 3 and 5) which are received in apertures 50L and that are respectively provided in the cover members 24L and 24R.

As shown in FIGS. 1 and 10, the assembly is secured together by a rivet 52 which extends through an opening 53 in the members 22, 24L and 24R. While the rivet 52 secures the assembly together as shown in FIG. 10, it should be noted that the blades 10L and 10R captured between member 22 and members 24L and 24R, respectively, are free to rotate relative to the central hub 14 when in the unclamped state.

With the blades 10L and 10R so positioned on central cam member 22, cam mating segments 54L and 54R, that are respectively formed on the hub cover members 24L and 24R, align with the cam surfaces 32L and 32R of the cam segments 30, which allow nesting of the cover members 24L and 24R with the central cam member 22, as shown in FIGS. 2 and 4.

The shoulder portions 43L and 43R of the central cam member 22 maintain a space between the cam surfaces 32L and 32R and the cam mating segments 54L and 54R so as to provide for movement of the followers 44L and 44R between the members 22, 24L and 24R. It also should be noted that the axial width of the shoulder portions 43L and 43R is less than the width of each of the saw blades 10L and 10R so that, when the assembly is secured together on the arbor 11, as shown in FIGS. 2, 4 and 10, by the nut 26, the saw blades 10L and 10R, through cam followers 44L and 44R are trapped between the surfaces 32L and 32R of the cam segments 30 and cam mating segments 54L and 54R and, accordingly, the dado cutting assembly rotates as a single unit with the arbor 11.

To insure that a minimum kerf is provided and that there is no material remaining in the center of the dado, the teeth of the saw blades 10L and 10R are offset to provide a slight overlap of the blade kerf in the plane P. To further insure that the saw blades 10L and 10R are juxtaposed to the plane P, a cam follower receiving area 49 is provided in the central cam member 22 in the area between the low point 36 of one segment 30 and the high point of the adjacent cam segment 30. This permits the radially inwardly edge of the skewed cam followers 44L and 44R of each of the saw blades 10L and 10R to contact each other when the assembly is in the minimum kerf position shown in FIGS. 2-3.

When the faces of the cam followers 44L and 44R are in engagement with the axial low point 36 and area 49, as shown in FIGS. 2, 3 and 7, the saw blades 10L and 10R are parallel with the juxtaposed on either side of the plane P. Relative rotation between the saw blades 10L and 10R and the central cam member 22, and more specifically the cam followers 44L and 44R, relative to their respective cam surfaces 32L and 32R will cause the saw blades 10L and 10R to rotate or pivot about the first point 15L and 15R on the peripheral edge of the blades. The cam surfaces 32L and 32R are so dimensioned relative to the plane P that the points 15L and 15R about which the saw blades 10L and 10R pivot, as mentioned above, remain juxtaposed to the plane P with the blades 10L and 10R diverging therefrom. Accordingly, the width of the dado to be cut is determined by the distance that the points 20L and 20R on the peripheral edges of the saw blade 10L and 10R which are diametrically opposite from the pivot points 15L and 15R, are spaced away from the plane P.

In the illustrated embodiment, there are provided three equally spaced cam segments 30. In employing three cam segments 30, the adjustment of the saw blades 10L and 10R between the minimum kerf and maximum kerf cutting positions require a relative rotational movement between the blades 10L and 10R and central cam member 22 of approximately 84°. It should be apparent that the number of cam segments employed may vary dependent on the maximum dado to be cut and the stability required and accordingly the degree of relative rotational travel between blades and the central cam member may also vary.

In order to compensate for the obliquity of the blades as they diverge from the pivot points 15L and 15R, the rise angle of the cam segments 30 vary in axial dimension relative to the plane P so that the cam followers will always be in intimate contact with their cooperating cam segment throughout the infinite adjustments of the blade between the minimum and maximum kerf. For example, the cam segments 30 closer to the pivot points 15L and 15R will have a smaller rise relative to the plane P than those which are farther from the pivot points.

In summary, to adjust the saw blades 10L and 10R to cut a wider dado, the central hub member 22 and the blades 10L and 10R are rotated relative to each other. This action causes the low point 36 of each cam segment 30 to move between the cooperating cam followers 44L and 44R thereby moving the blades 10L and 10R radially outwardly at an angle to the plane P while maintaining the pivot points 15L and 15R juxtaposed to the plane P.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. A multiple saw blade adjustable dado cutting assembly comprising:
   (a) a pair of circular saw blades including a central opening;
   (b) central hub means rotatable on an axis supporting said saw blades adjacent to each side of a central plane perpendicular to said axis; and
   (c) saw blade adjusting means on said central hub means interactionable with means on said saw blades for causing relative movement between said saw blades and said plane so that dados of various selected widths can be cut by rotation of said supporting axis,
   (d) said saw blades being selectively movable by said saw blade adjusting means between a minimum dado cutting position, wherein said saw blades are juxtaposed to said plane and parallel to said plane and to each other with both of their diametrically opposite first and second edges adjacent to each other, and wider dado cutting positions, wherein said saw blades are pivoted about first points respectively located on each of said first peripheral edges of said saw blades to selectively adjust spacing along said axis between second points respectively located on said diametrically opposite second peripheral edges of each of said saw blades while retaining said first peripheral edges of said saw blades adjacent to each other.

2. The invention of claim 1, wherein said saw blade adjusting means comprises cam means.

3. The invention of claim 2, wherein said cam means is positioned between said saw blades.

4. The invention of claim 3, wherein said cam means includes means diverging outwardly along said axis.

5. A multiple saw blade adjustable dado cutting assembly comprising:
   (a) a pair of circular saw blades including a central opening;
   (b) central hub means rotatable on an axis supporting said saw blades adjacent to each side of a central plane perpendicular to said axis; and
   (c) saw blade adjusting means on said central hub means interactionable with means on said saw blades for causing relative movement between said saw blades and said plane so that dados of various selected widths can be cut by rotation of said supporting axis,
   (d) said saw blades being slectively movable by said saw blade adjusting means between a minimum dado cutting position, wherein said saw blades are juxtaposed to said plane and parallel to said plane and to each other with both of their diametrically opposite first and second edges adjacent to each other, and wider dado cutting positions, wherein said saw blades are pivoted about first points respectively located on each of said first peripheral edges of said saw blades to selectively adjust spacing along said axis between second points respectively located on said diametrically opposite second peripheral edges of each of said saw blades adjacent to each other, (e) said saw blade adjusting means comprising cam means, (f) said cam means being positioned between said saw blades, (g) said cam means including means diverging outwardly along said axis, and (h) said cam means being on said central hub means and being interactionable with cam follower means on said saw blades for causing said relative movement between said saw blades and said plane.

6. The invention of claim 5, wherein cam following members on each of said blades are dimensioned for engaging said cam means.

7. The invention of claim 6, wherein said cam means includes a plurality of cam segments each diverging circumferentially from a low point in said plane to a high point spaced equal distance from said plane.

8. The invention of claim 7, wherein said cam following members on each of said blades project radially inwardly from said central opening dimensioned to engage cooperating ones of said cam segments.

9. The invention of claim 8, wherein said central hub means includes cover members arranged on each side of said central hub means, each of cover members having cam mating surfaces associated with said cam segments so that said cam following members of said blades are positioned between each side of said cam setments and said cover members for securely holding said blades relative to said central hub means.

10. The invention of claim 9, wherein a receiving area is provided between the low point of each of said cam segments and the high point of an adjacent cam segment wherein in said minimum dado cutting position at least a portion of said cam followers will be in said plane.

11. The invention of claim 10, wherein each of said blades include a plurality of kerfed cutting teeth which are offset when said blades are in said minimum dado cutting position so that said offset teeth overlap into said plane.

12. The invention of claim 11, wherein the inner radial ends of said cam following members define an inner opening on said blades.

13. The invention of claim 12, wherein said cam segments include shoulder means being received in said inner opening of said blades for rotatably supporting said blades relative to said central hub member.

14. A multiple saw blade adjustable dado cutting assembly comprising:

(a) a pair of circular saw blades including a central opening;

(b) central hub means rotatable on an axis supporting said saw blades adjacent to each side of a central plane perpendicular to said axis; and (c) saw blade adjusting means on said central hub means interactionable with means on said saw blades for causing relative movement between said saw blades and said plane so that dados of various selected widths can be cut by rotation of said supporting axis, (d) said saw blades being selectively movable by said saw blade adjusting means between a minimum dado cutting position, wherein said saw blades are juxtaposed to said plane and parallel to said plane and to each other with both of their diametrically opposite first and second edges adjacent to each other, and wider dado cutting positions, wherein said saw blades are pivoted about first points respectively located on each of said first peripheral edges of saw blades to selectively adjust spacing along said axis between second points respectively located on said diametrically opposite second peripheral edges of said saw blades adjacent to each other, (e) said saw blade adjusting means comprising cam means, and (f) said cam means being on said central hub means and being interactionable with cam follower means on said saw blades for causing said relative movement between said saw blades and said plane.

15. A multiple saw blade adjustable dado cutting assembly comprising:

(a) a pair of circular saw blades including a central opening;

(b) central hub means rotatable on an axis supporting said saw blades adjacent to each side of a central plane perpendicular to said axis; and (c) saw blade adjusting means on said central hub means interactionable with means on said saw blades for causing relative movement between said saw blades and said plane so that dados of various selected widths can be cut by rotation of sais supporting axis, (d) said saw blades being selectively movable by said saw blade adjusting means between a minimum dado cutting position, wherein said saw blades are juxtaposed to said plane and parallel to said plane and to each other with both of their diametrically opposite first and second edges adjacent to each other, and wider dado cutting positions, wherein said saw blades are pivoted about first points respectively located on each of said first peripheral edges of saw blades to selectively adjust spacing along said axis between second points respectively located on said diametrically opposite second peripheral edges of each of said saw blades adjacent to each other, (e) said saw blade adjusting means comprising cam means, (f) said cam means being positioned between said saw blades, and (g) said cam means being on said central hub means and being interactionable with cam follower means on said saw blades for causing said relative movement between said saw blades and said plane.

* * * * *